(12) United States Patent
Cohen et al.

(10) Patent No.: US 7,397,948 B1
(45) Date of Patent: Jul. 8, 2008

(54) SYSTEM AND METHOD FOR IMAGE AND VIDEO SEGMENTATION BY ANISOTROPIC KERNEL MEAN SHIFT

(75) Inventors: Michael Cohen, Seattle, WA (US); Bo Thiesson, Woodinville, WA (US); Ying-Qing Xu, Beijing (CN); Jue Wang, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 976 days.

(21) Appl. No.: 10/796,736

(22) Filed: Mar. 8, 2004

(51) Int. Cl.
  *G06K 9/00* (2006.01)
(52) U.S. Cl. .................. 382/167; 382/164; 382/173; 382/201; 382/205
(58) Field of Classification Search ........ 382/162, 382/164, 166, 167, 171, 173, 201, 205, 128, 382/131; 708/490; 707/6
  See application file for complete search history.

(56) References Cited

U.S. PATENT DOCUMENTS

| | | | |
|---|---|---|---|
| 2003/0195883 A1* | 10/2003 | Mojsilovic et al. | 707/6 |
| 2005/0135663 A1* | 6/2005 | Okada et al. | 382/128 |
| 2005/0286764 A1* | 12/2005 | Mittal et al. | 382/181 |
| 2006/0050958 A1* | 3/2006 | Okada et al. | 382/173 |

OTHER PUBLICATIONS

Comaniciu, D., An algorithm for data-driven bandwidth selection, *IEEE Trans. on Pattern Analysis and Mach. Intelligence*, Feb. 2003, vol. 25, No. 2, pp. 281-288.

Comaniciu, D., P. Meer, Mean shift analysis and applications, *Proc. IEEE Int'l. Conf. on Computer Vision*, Greece, 1999, pp. 1197-1203.
Comaniciu, D., P. Meer, Mean shift: A robust approach toward a feature space analysis, *IEEE Trans. on Pattern Analysis and Mach. Intelligence*, 2002, pp. 603-619.
Comaniciu, D., V. Ramesh, P. Meer, Real-time tracking on non-rigid objects using mean shift, *Proc. IEEE Int'l. Conf. on Computer Vision and Pattern Recognition*, 2000, pp. 142-151.
Comaniciu, D., V. Ramesh, P. Meer, The variable bandwidth mean shift and data-driven scale selection, *Proc. of the 8th IEEE Int'l. Conf. on Computer Vision, ICCV'01*, Canada, 2001, pp. 438-445.

(Continued)

*Primary Examiner*—Matthew C. Bella
*Assistant Examiner*—Ali Bayat
(74) *Attorney, Agent, or Firm*—Lyon & Harr, LLP; Katrina A. Lyon

(57) ABSTRACT

Mean shift is a nonparametric estimator of density which has been applied to image and video segmentation. Traditional mean shift based segmentation uses a radially symmetric kernel to estimate local density, which is not optimal in view of the often structured nature of image and more particularly video data. The system and method of the invention employs an anisotropic kernel mean shift in which the shape, scale, and orientation of the kernels adapt to the local structure of the image or video. The anisotropic kernel is decomposed to provide handles for modifying the segmentation based on simple heuristics. Experimental results show that the anisotropic kernel mean shift outperforms the original mean shift on image and video segmentation in the following aspects: 1) it gets better results on general images and video in a smoothness sense; 2) the segmented results are more consistent with human visual saliency; and 3) the system and method is robust to initial parameters.

28 Claims, 10 Drawing Sheets

OTHER PUBLICATIONS

DeMenthon, D., Spatio-temporal segmentation of video by hierarchical mean shift analysis, *Proc. IEEE Int'l. Conf. on Comp. Vision and Pattern Recognition*, 2000, pp. 142-151.

Fukunaga, K., L. Hostetler, The estimation of the gradient of a density function, with applications in pattern recognition, *IEEE Trans. Information Theory*, 1975, vol. 21, pp. 32-40.

Lorensen, W. E., H. E. Cline, Marching cubes: A high resolution 3D surface reconstruction algorithm, *Proc. ACM SIGGRAPH*, 1987, pp. 163-169.

Megret, R., D. DeMenthon, A survey of spatio-temporal grouping techniques, Technical Report: LAMP-TR-094/CS-TR-4403, University of Maryland, College Park, 1994.

Pal, N. R., Pal. S. K., A review on image segmentation techniques, Pattern Recognition, 1993, vol. 26, No. 9, pp. 1277-1294.

Skarbek, W., A. Koschan, Colour image segmentation: A survey, Technical Report, Technical University Berlin, 1994.

* cited by examiner

SYSTEM AND METHOD FOR IMAGE AND VIDEO SEGMENTATION BY ANISOTROPIC KERNEL MEAN SHIFT

BACKGROUND

1. Technical Field

The invention is related to a system and method for segmenting image and video data. More particularly, this invention is related to a system and method for segmenting image and video data using an anisotropic kernel mean shift technique.

2. Related Art

Image segmentation refers to identifying homogenous regions in an image, while video segmentation refers to the joint spatial and temporal analysis on video sequences to extract regions in the dynamic scenes. Both of these tasks are misleadingly difficult and have been extensively studied for several decades. Generally, spatio-temporal video segmentation can be viewed as an extension of image segmentation from a 2D to a 3D lattice. Recently, mean shift based image and video segmentation has gained considerable attention due to its promising performance.

Many other data clustering methods have been described in the literature, ranging from top down methods such as K-D trees, to bottom up methods such as K-means and more general statistical methods such as mixtures of Gaussians. In general, these methods have not performed satisfactorily for segmenting image data due to their reliance on an a priori parametric structure of the data segment, and/or estimates of the number of segments expected. The appeal of image and video segmentation using mean shift is derived from both its performance and its relative freedom from specifying an expected number of segments. This freedom has come at the cost of having to specify the size (bandwidth) and shape of an influence kernel for each pixel in advance.

The difficulty in selecting the kernel for mean shift segmentation was recognized in [3,4] and was addressed by automatically determining a bandwidth for spherical kernels.

Rather than begin from an initial guess at the segmentation, such as seeding points as in K-means, mean shift begins at each data point (or pixel in an image or video) and first estimates the local density of similar pixels (i.e., the density of nearby pixels with similar color). Carefully defining "nearby" and "similar" can have an important impact on the results. This is the role the kernel plays. More specifically, mean shift algorithms estimate the local density gradient of similar pixels. These gradient estimates are used within an iterative procedure to find the peaks in the local density. All pixels that are drawn upwards to the same peak are then considered to be members of the same segment.

As a general nonparametric density estimator, mean shift is an old pattern recognition procedure proposed by Fukunage and Hostetler [7], and its efficacy on low-level vision tasks such as segmentation and tracking has been extensively exploited recently. In [1,5], it was applied for continuity preserving filtering and image segmentation. Its properties were reviewed and its convergence on lattices was proven. In [2], it was used for non-rigid objects tracking and a sufficient convergence condition was given. Applying mean shift on a 3D lattice to obtain a spatio-temporal segmentation of video was achieved in [6], in which a hierarchical strategy was employed to cluster pixels of 3D space-time video stack, which were mapped to 7D feature points (position(2), time (1), color(3), and motion(1)).

The application of mean shift to an image or video consists of two stages. The first stage is to define a kernel of influence for each pixel $x_i$. This kernel defines a measure of intuitive distance between pixels, where distance encompasses both spatial (and temporal in the case of video) as well as color distance. All the approaches described above used a simple static radially symmetric kernel for the mean shift procedure.

The second stage first assigns to each pixel a mean shift point, $M(x_i)$, initialized to coincide with the pixel. These mean shift points are then iteratively moved upwards along the gradient of the density function defined by the sum of all the kernels until they reach a stationary point (a mode or hilltop on the virtual terrain defined by the kernels). The pixels associated with the set of mean shift points that migrate to the (approximately) same stationary point are considered to be members of a single segment. Neighboring segments may then be combined in a post process.

Mathematically, the general multivariate kernel density estimate at the point, x, is defined by $$\hat{f}(x) = \frac{1}{n}\sum_{i=1}^{n} K_H(x - x_i) \qquad (1)$$

where the n data points $x_i$ represent a sample from some unknown density f, or in the case of images or video, the pixels themselves.

$$K_H(x) = |H|^{-1/2} K(H^{-1/2} x) \qquad (2)$$

where $K(z)$ is the d-variate kernel function with compact support satisfying the regularity constraints as described in [13], and H is a symmetric positive definite d×d bandwidth matrix. For the radially symmetric kernel, one has $$K(z) = ck(\|z\|^2) \qquad (3)$$

where c is the normalization constant. A common practice when applying a mean shift procedure on an image or video lattice is to assume a global spherical bandwidth, $H = h^2 I$. In this way the kernel density estimator becomes $$\hat{f}(x) = \frac{1}{n(h)^d}\sum_{i=1}^{n} K\left(\frac{x - x_i}{h}\right) \qquad (4)$$

For image and video segmentation, the feature space is composed of two independent domains: the spatial/lattice domain and the range/color domain. One maps a pixel to a multi-dimensional feature point which includes the p dimensional spatial lattice (p=2 for image and p=3 for video) and q dimensional color (q=3 for L*u*v color space). Due to the different natures of the domains, the kernel is usually broken into the product of two different radially symmetric kernels (superscript s will refer to the spatial domain, and r to the color range):

$$K_{h^s,h^r}(x) = \frac{c}{(h^s)^p (h^r)^q} k^s\left(\left\|\frac{x^s}{h^s}\right\|^2\right) k^r\left(\left\|\frac{x^r}{h^r}\right\|^2\right) \qquad (5)$$

where $x^s$ and $x^r$ are respectively the spatial and range parts of a feature vector; $k^s$ and $k^r$ are the profiles used in the two domains; $h^s$ and $h^r$ are employed bandwidths in two domains; and c is the normalization constant. With the kernel from (5), the kernel density estimator is $$\hat{f}(x) = \frac{c}{n(h^s)^p(h^r)^q} \sum_{i=1}^{n} k^s \left( \left\| \frac{x^s - x_i^s}{h^s} \right\|^2 \right) k^r \left( \left\| \frac{x^r - x_i^r}{h^r} \right\|^2 \right) \quad (6)$$

As apparent in Eqns. 5 and 6, there are two main parameters that have to be defined by the user for the static radially symmetric kernel based approach: the spatial bandwidth $h^s$ and the range bandwidth $h^r$. Although manual bandwidth selection can produce satisfactory results on general image segmentation, it has a significant limitation: the algorithm is sensitive to the initial bandwidths. When local characteristics of the feature space differ significantly across the data, it is difficult to select globally optimal bandwidths. As a result, in the segmented image some objects may appear too coarse while others are too fine. Two efforts still using radially symmetric kernels have been reported to address this problem. Singh and Ahuja [12] first determine local bandwidths using Parzen windows to estimate local density. Another variable bandwidth mean shift procedure was proposed in [3], in which the estimator (6) is changed to $$\hat{f}(x) = \frac{1}{n} \sum_{i=1}^{n} \frac{c}{(h_i^s)^p (h_i^r)^q} k^s \left( \left\| \frac{x^s - x_i^s}{h_i^s} \right\|^2 \right) k^r \left( \left\| \frac{x^r - x_i^r}{h_i^r} \right\|^2 \right) \quad (7)$$

There are now important differences between (6) and (7). First, potentially different bandwidths $h_i^s$ and $h_i^r$ are assigned to each pixel, $x_i$, as indicated by the subscript i. Equations [3] and [4] offer a data driven way to select a different set of bandwidth parameters to obtain an optimal tradeoff between bias and variance when estimating f. Second, the different bandwidths associated with each point appear within the summation. This is the so-called sample point estimator [3], as opposed to the balloon estimator defined in Equation (6). The sample point estimator ensures that all pixels respond to the same global density estimation during the segmentation procedure. Note that the sample point and balloon estimators are the same in the case of a single globally applied bandwidth. Advantages of the variable bandwidth over the fixed bandwidth mean shift were demonstrated on synthetic 1D mixtures of Gaussians in which some Gaussians were more heavily sampled than others [3]. In particular, larger bandwidths are selected in sparse regions to overcome the effects of noise. The differences on general images was discussed briefly and video applications were left for future work.

During the iterative stage of the mean shift procedure, the mean shift points associated with each pixel climb to the hilltops of the density function. At each iteration, each mean shift point is attracted in varying amounts by the sample point kernels centered at nearby pixels. More intuitively, a kernel represents a measure of the likelihood that other points are part of the same segment as the point under the kernel's center. With no a priori knowledge of the image or video, actual distance (in space, time, and color) seems an obvious (inverse) correlate for this likelihood; the closer two pixels are to one another the more likely they are to be in the same segment.

Although the previous mean shift segmentation techniques are very advantageous, there are some disadvantages of using the mean shift segmentation techniques which employ a radially symmetric kernel. Radially symmetric kernels do not adapt well to non-compact (i.e., long skinny) local features. Such features are even prevalent in video data from stationary or from slowly or linearly moving cameras. When considering video data, a spatio-temporal slice (parallel to the temporal axis) is as representative of the underlying data as any single frame (orthogonal to the temporal axis). Such a slice of video data exhibits stripes with a slope relative to the speed at which objects move across the visual field. In particular, a still background will show as vertical stripes in a spatio-temporal slice. The problems in the use of radially symmetric kernels is particularly apparent in these spatio-temporal slice segmentations. The irregular boundaries between and across the stripe-like features cause a lack of temporal coherence in the video segmentation.

Therefore, what is needed is a system and method for segmenting image and video data that accurately segments non-compact objects.

It is noted that in the remainder of this specification, as well as in the paragraphs above, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The system and method of the present invention leverages prior work on mean shift segmentation and extends it to automatically select general elliptical (anisotropic) kernels for each pixel. Allowing the kernels the extra freedom to adapt to the local structure in the data is shown to be robust and particularly applicable to segmentation of video data. The system and method of the invention takes advantage of examining a local region surrounding each pixel to select the size and shape of the kernel. The invention can leverage the full local covariance matrix for the data to create a kernel with a general elliptical shape. Such kernels can better adapt to non-compact (i.e., long skinny) local features. Furthermore, an anisotropic kernel can adapt its profile to the local structure of the data. Due to its advantage of exploring the local characteristics of the feature space, the system and method of the invention proves more robust, and is less sensitive to initial parameters compared with the static one. Furthermore, the anisotropic kernel provides a set of handles for application-driven segmentation. For instance, a user may desire that the still background regions be more coarsely segmented while the details of the moving objects to be preserved when segmenting a video sequence. To achieve this, one simply expands those local kernels (in the color and/or spatial dimensions) whose profiles have been elongated along the time dimension. By providing a set of heuristic rules described below on how to modulate the kernels, the segmentation strategy can be adapted to various applications.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
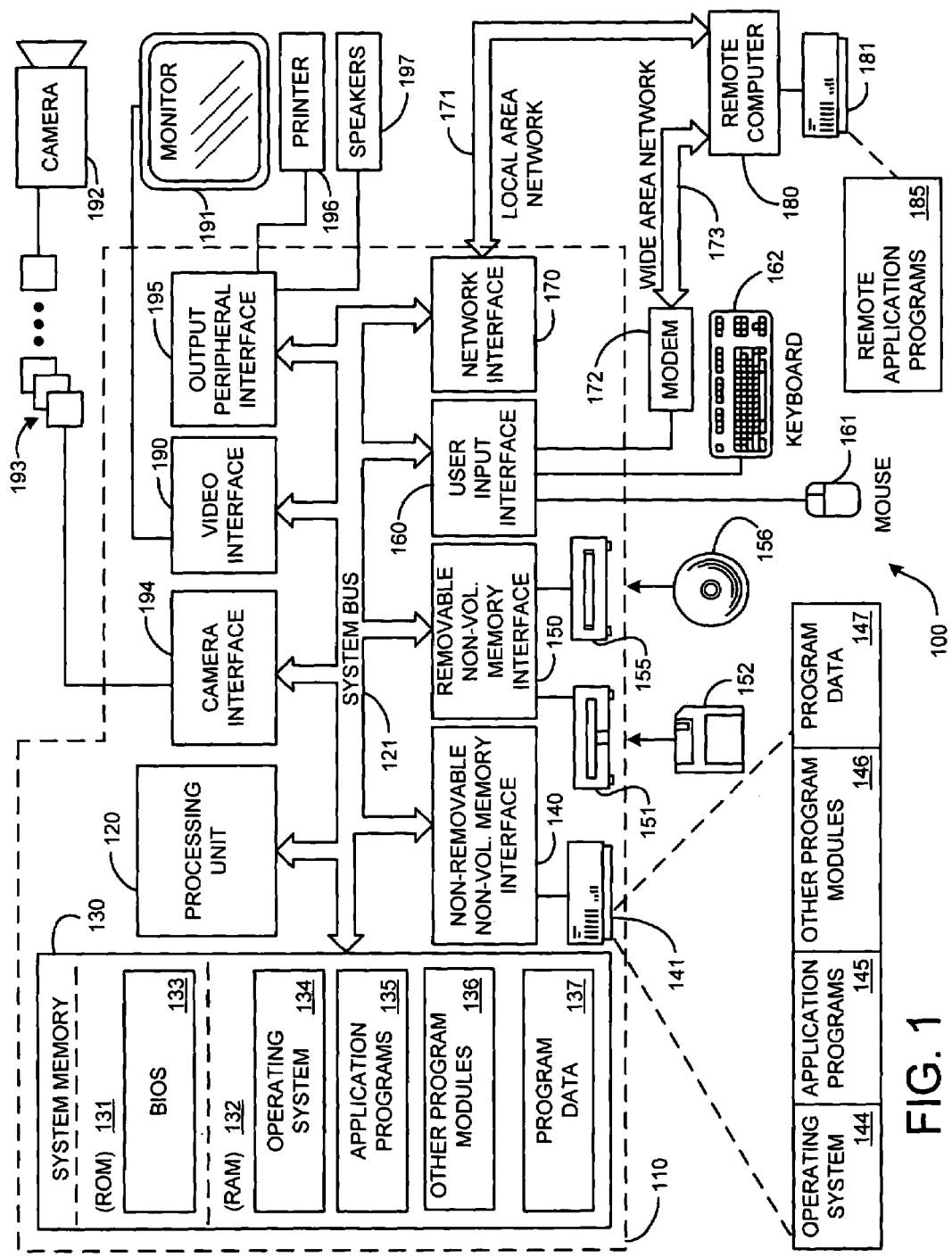
FIG. 1 is a general system diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 A System and Method for Image and Video Segmentation by Anisotropic Kernel Mean Shift.

The following paragraphs provide the details of the system and method according to the invention as well as the results of testing of an exemplary embodiment of the invention.

2.1 Anisotropic Kernel Mean Shift.

2.1.1 Definition

The Anisotropic Kernel Mean Shift system and method of the present invention associates with each data point (a pixel in an image or video) an anisotropic kernel. The kernel associated with a pixel adapts to the local structure by adjusting its shape, scale, and orientation. Formally, the kernel density estimator is written as $$\hat{f}(x) = \frac{1}{n} \sum_{i=1}^{n} \frac{1}{h^r(H_i^s)^q} k^s(g(x^s, x_i^s, H_i^s)) k^r \left( \left\| \frac{x^r - x_i^r}{h^r(H_i^s)} \right\|^2 \right) \quad (8)$$

where $g(x_s, x_i^s, H_i^s)$ is the Mahalanobis metric in the spatial domain:

$$g(x^s, x_i^s, H_i^s) = (x_i^s - x^s)^T H_i^{-1} (x_i^s - x^s) \quad (9)$$

The system and method according to the invention uses a spatial kernel with a constant profile, $k^s(z)=1$ if $|z|<1$, and 0 otherwise. For the color domain the system and method according to the invention uses an Epanechnikov kernel with a profile $k^r(z)=1-|z|$ if $|z|<1$ and 0 otherwise. Note that in the definition, the bandwidth in color range $h^r$ is a function of the bandwidth matrix in space domain $H_i^s$. Since $H_i^s$ determined by the local structure of pixels in an image or video, $h^r$ thus varies from one pixel to another. Possibilities on how to modulate $h^r$ according to $H^s$ are discussed later.

The bandwidth matrix $H_i^s$ is symmetric positive definite. If it is simplified into a diagonal matrix with equal diagonal elements, (i.e., a scaled identity), then $H_i^s$ models the radially symmetric kernels. In the case of video data, the time dimension may be scaled differently to represent notions of equivalent "distance" in time vs. image space. In general, allowing the diagonal terms to be scaled differently allows for the kernels to take on axis aligned ellipsoidal shapes. A full $H_i^s$ matrix provides the freedom to model kernels of a general ellipsoidal shape oriented in any direction. The Eigen vectors of $H_i^s$ will point along the axes of such ellipsoids. The system and method according to the invention uses this additional freedom to shape the kernels to reflect local structures in the video as described in the next section.

2.2. Kernel Modulation Strategies

Anisotropic kernel mean shift provides a set of handles on modulating the kernels during the mean shift procedure. How to modulate the kernel is application-related and there is not a uniform theory for guidance. The invention provides some intuitive heuristics for video data with an eye towards visually salient segmentation, as well as aiding in automatic cartoonization of the video. In the case of video data it is desirable to give long skinny segments at least an equal chance to form as more compact shapes. These features often define the salient features in an image. In addition, they are often very prominent features in the spatio-temporal slices as can be seen in many spatio-temporal diagrams. In particular, one wants to recognize segments with special properties in the time domain. For example, one may wish to allow static objects to form into larger segments while moving objects to be represented more finely with smaller segments.

An anisotropic bandwidth matrix $H_i^s$ first estimated starting from a standard radially symmetric diagonal $H_i^s$ and color radius $h^r$. The neighborhood of pixels around $x$ is defined by those, $x_i$, for which $$k^s(g(x, x_i, H_i^s)) < 1; \; k^r \left( \left\| \frac{x - x_i}{h^r(H_i^s)} \right\|^2 \right) < 1 \quad (10)$$

An analysis of variance of the locations, $x_i - x$, of the points within this neighborhood provides a new full matrix $H_i^s$ that better describes the local neighborhood of points.

To understand how to modulate the full bandwidth matrix $H_i^s$, it is useful to decompose it as $$H_i^s = \lambda D A D^T \quad (11)$$

where $\lambda$ is a global scalar, D is a matrix of normalized Eigen vectors, and A is a diagonal matrix of Eigen values which is normalized to satisfy:

$$\prod_{i=1}^{p} a_i = 1 \quad (12)$$

where $a_i$ is the $i^{th}$ diagonal elements of A, and $a_i \geq a_j$, for $i<j$. Thus, $\lambda$ defines the overall volume of the new kernel, A defines the relative lengths of the axes, and D is a rotation matrix that orients the kernel in space and time. This results in intuitive handles for modulating the anisotropic kernel. The D matrix calculated by the covariance analysis is kept unchanged during the modulation process to maintain the orientation of the local data. By adjusting A and $\lambda$, one can control the spatial size and shape of the kernel. For example, one can encourage the segmentation to find long skinny regions by diminishing the smaller Eigen values in A as $$a_i = \begin{cases} a_i^{3/2} & a_i <= 1 \\ \sqrt{a_i} & a_i > 1 \end{cases}, i = 2, \ldots, p \quad (13)$$

In this way the spatial kernel will stretch more in the direction in which the object elongates. To create larger segments for static objects, the present invention detects kernels oriented along the time axis as follows. First, a scale factor $s_t$ is computed as $$s_t = \alpha + (1 - \alpha) \prod_{i=1}^{p} d_1(i)^2 \quad (14)$$

where $d_1$ is the first Eigen vector in D, which corresponds with the largest Eigen value $a_1 \cdot d_1(i)$ stands for the ith element in $d_1$, which is the x, y and t component of the vector when i=1, 2, 3, respectively. $\alpha$ is a constant between 0 and 1. In the system and method according to the invention, $\alpha$ is set to 0.25. The product in the above equation corresponds to the cosine of the angle between the first Eigen vector and the time axis. If the stretch direction of the kernel is close to the time axis, the scale factor is close to a small value $\alpha$. Otherwise if the stretch direction is orthogonal to the time axis, then $s_t$ is close to 1. The matrix A is thus changed as $$a_i' = a_i s_t, \; i = 2, \ldots, p \quad (15)$$

After the matrix A is modified by (13) and/or (14), the global scalar $\lambda$ is changed correspondingly as $$\lambda' = \lambda \prod_{i=1}^{p} \frac{a_i}{a_i'} \quad (16)$$

To keep the analysis resolution in the color domain consistent with that in space domain, the bandwidth in the color domain is changed to $$h^r(H_i^S) \leftarrow \sqrt{\frac{\lambda'}{\lambda}} \cdot h^r(H_i^S) \quad (17)$$

The effect is to increase the color tolerance for segments that exhibit a large stretch, typically along the time axis (i.e., the segments that are static in the video).

2.3. Anisotropic Mean Shift Segmentation Method.

Figure 2:
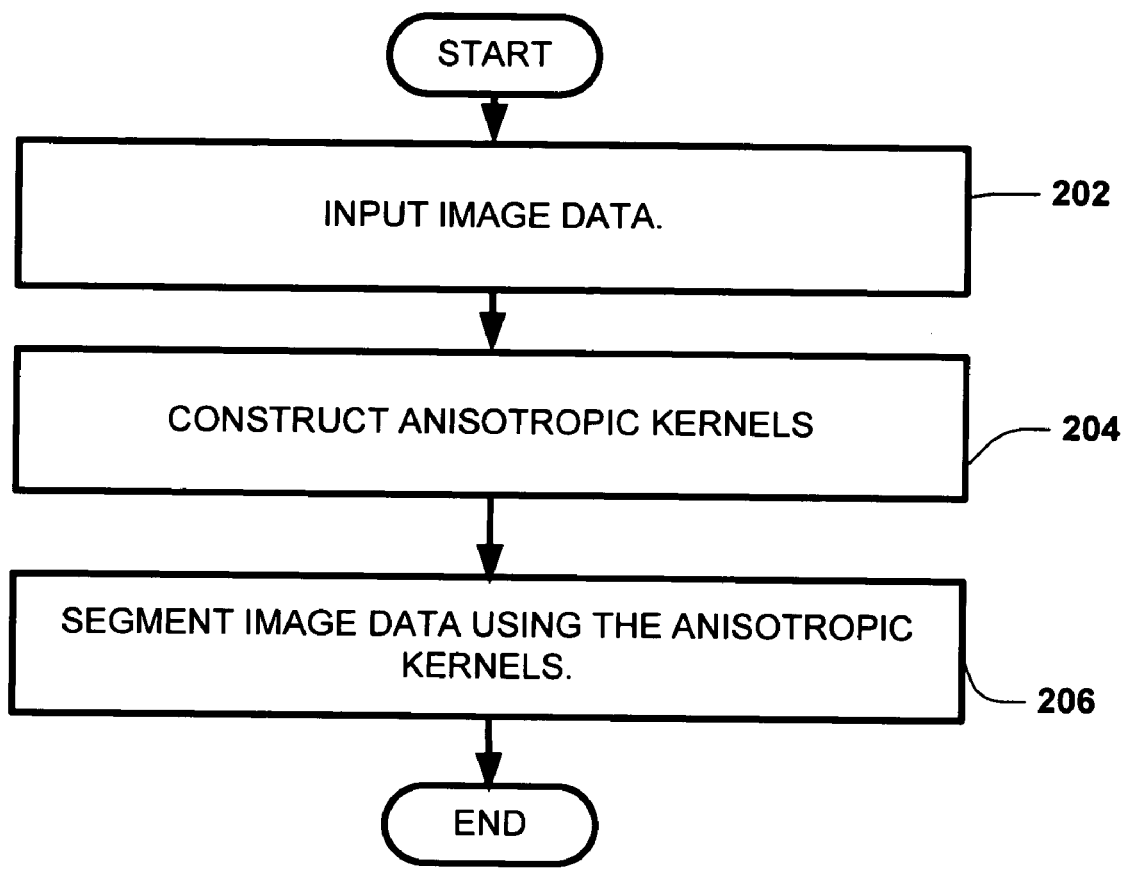
FIG. 2 provides a simplified flow diagram of the system and method according to the invention.
Figure 3A:
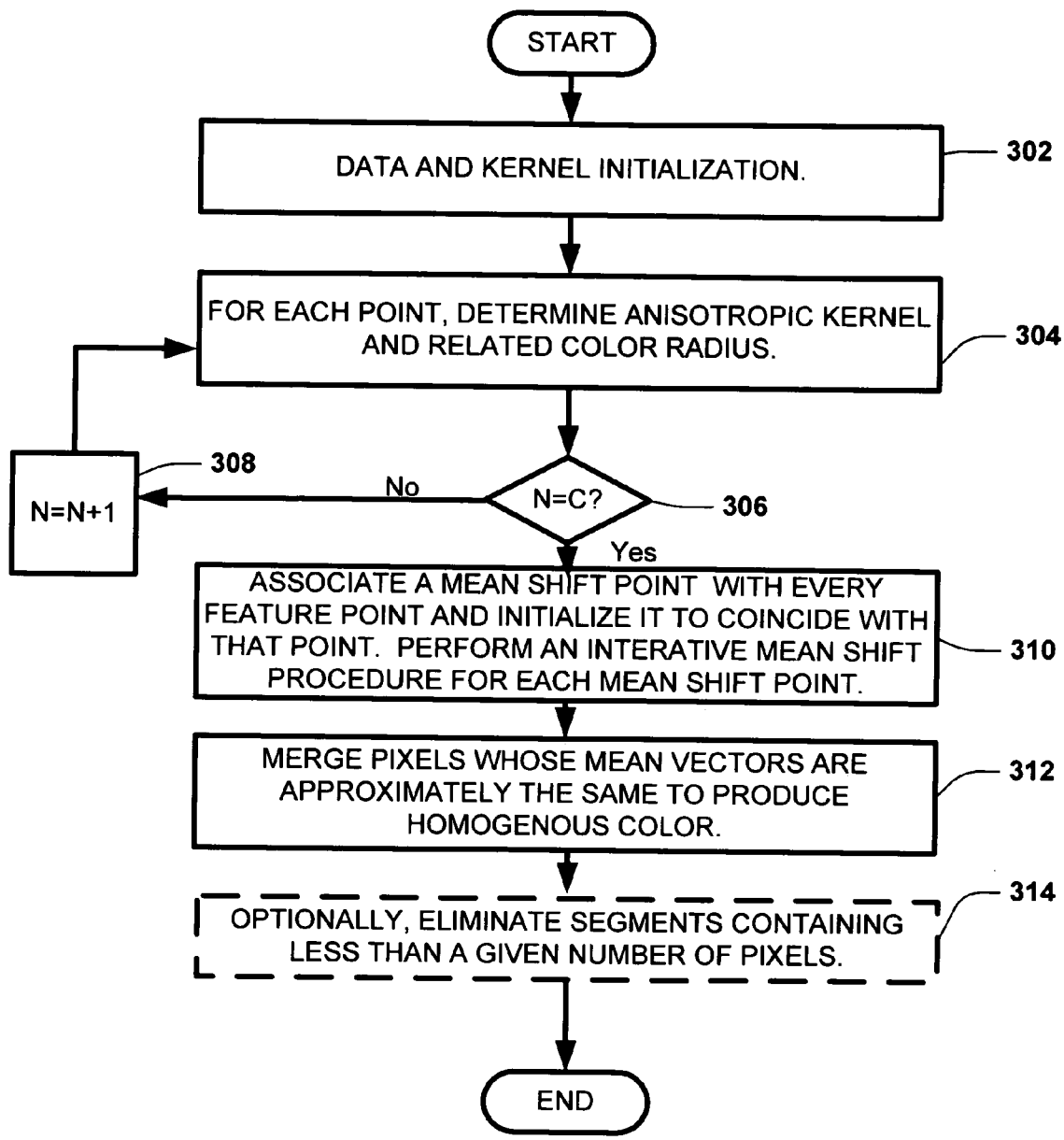
FIG. 3A provides a more detailed flow diagram of the system and method of employing anisotropic kernels with a mean shift segmentation technique according to the invention.
Figure 3B:
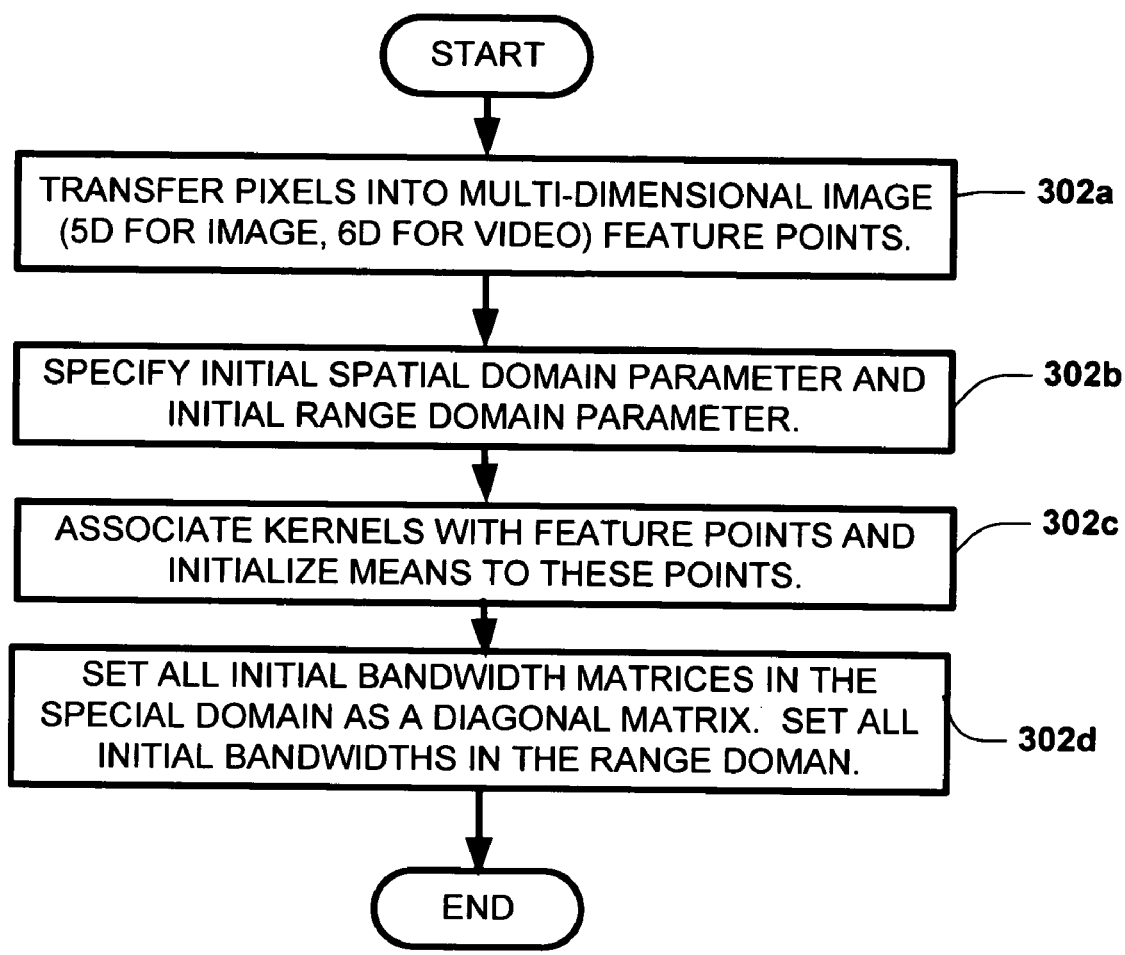
FIG. 3B provides a flow diagram of the system and method of initializing the anisotropic kernels and associated data according to the invention.

The anisotropic mean shift segmentation is very similar to the traditional mean shift segmentation algorithm. The primary difference is that a new anisotropic spatial kernel and space dependent kernel in the color domain are determined individually for each feature point prior to the main mean shift procedure. Recall that when kernels vary across feature points, the sample point estimator should be used in the mean shift procedure. The sample point anisotropic mean shift method is formally described below. As shown in FIG. 2, the primary process actions of the invention involve constructing anisotropic kernels (process action 204) and segmenting image data using these kernels (process 206). In the procedure below, steps 1-3 are the construction of kernels and steps 4-6 represent the main mean shift procedure for these kernels. More specifically, the process actions of the system and method of the invention are shown in FIGS. 3A, 3B, 3C and 3D. Referring to FIG. 3A, 1. The overall process begins with data and kernel initialization (process action 302). In order to initialize the data and kernels, as shown in FIG. 3B, the system and method of the invention, Transfers pixels into multidimensional (5D for image, 6D for video) feature points, $x_i$. (process action 302a).

Specifies initial spatial domain parameter $h_0^s$ and initial range/color domain parameters $h_0^r$. (process action 302b)

Associates kernels with feature points and initializes means to these points. (process action 302c)

Sets all initial bandwidth matrices in the spatial domain as the diagonal matrix $H_i^s=(h_0^s)^2 I$, where I is the identity matrix. Sets all initial bandwidths in the range/color domain as $h^r(H_i^s)=h_0^r$ (process actions 302d).

Figure 3C:
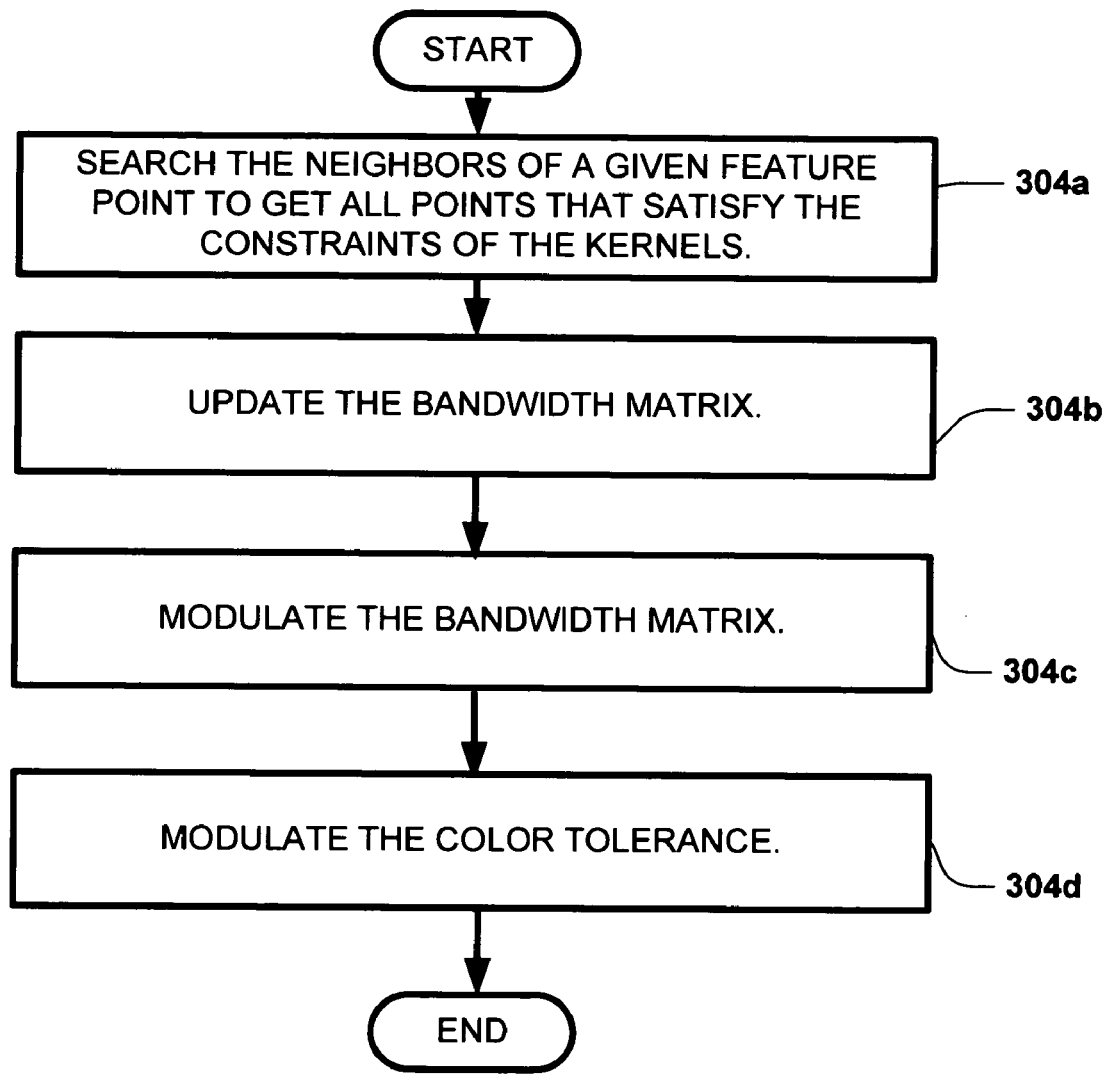
FIG. 3C provides a flow diagram of the system and method of determining the anisotropic kernel and related color radius for each feature point according to the invention.

2. Once the kernels and data are initialized, for each point $x_i$, the system and method of the invention determines the anisotropic kernel and related color radius (FIG. 3A, process action 304). More specifically, as shown in FIG. 3C, the system and method for each point $x_i$:

Searches the neighbors of $x_i$ to get all the points $x_j$, j=1, . . . , n that satisfy the constraints of kernels:

$$k^2(g((x_i, x_j, H_i^S)) < 1; k^r \left\| \frac{x_i - x_j}{h^r(H_i^S)} \right\|^2 < 1 \quad (18)$$

(process action 304a)

Updates the bandwidth matrix $H_i^s$ as:

$$H_i^s \leftarrow \frac{\sum_{j=1}^{n} \left\| \frac{x_i^r - x_j^r}{h^r(H_i^s)} \right\|^2 (x_j^s - x_i^s)(x_j^s - x_i^s)^T}{\sum_{j=1}^{n} \left\| \frac{x_i^r - x_j^r}{h^r(H_i^s)} \right\|^2} \quad (19)$$

(process action 304b).

Modulates $H_i^s$ as discussed in the previous section (process action 304c). For image segmentation, apply the modulations for exaggerating eccentricity (13) and modifying overall scale (16) sequentially; for video segmentation, sequentially apply the modulations for eccentricity (13), scaling for static segments (15), and overall scale (16).

Modulates color tolerance $h^r(H_i^s)$ as described in (17) (process action 304d).

3. As shown in FIG. 3A, process actions 306, 308, step (2) is repeated a fixed number of times (3 times in one embodiment).

Figure 3D:
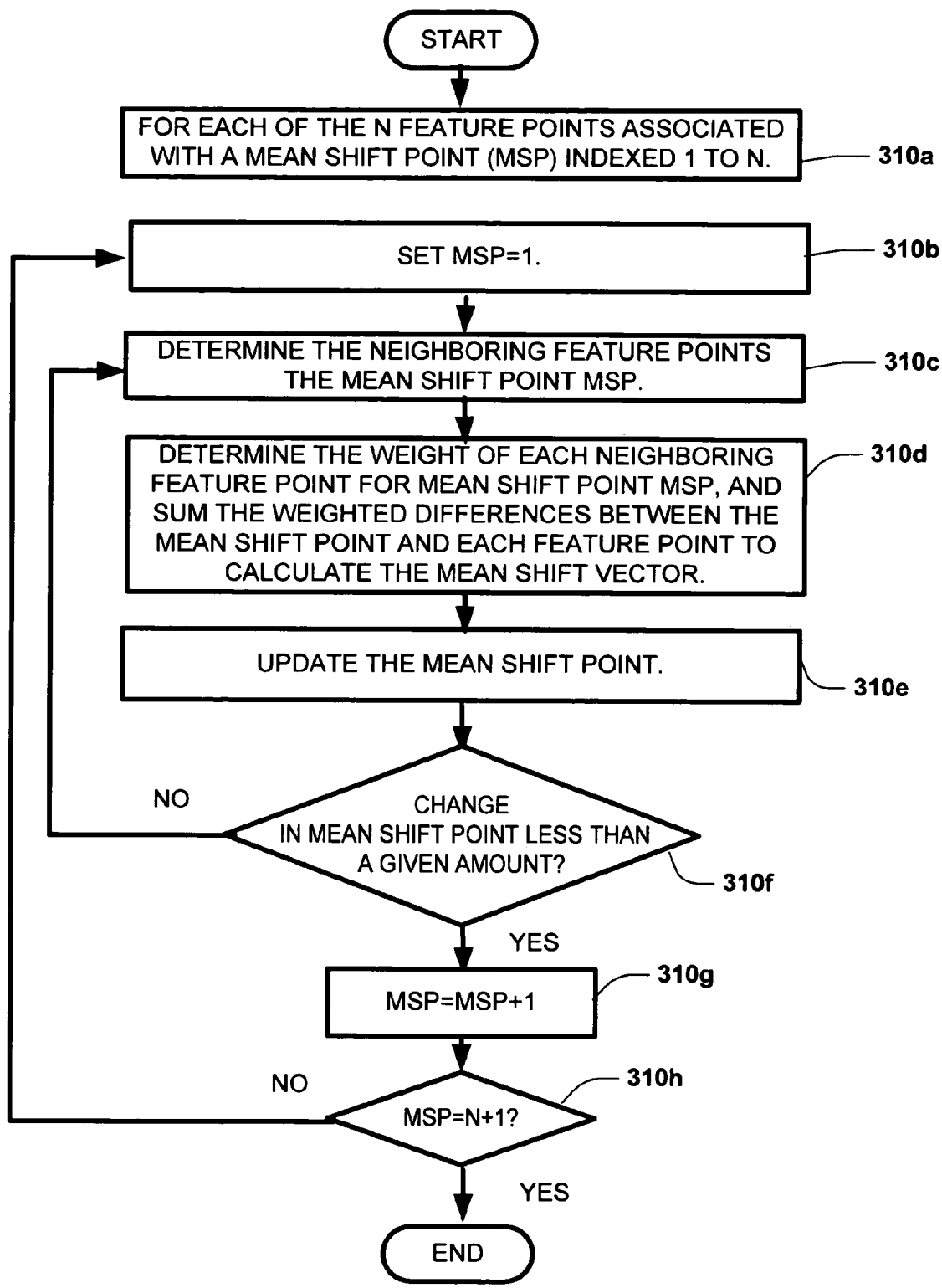
FIG. 3D provides a flow diagram of the system and method of associating a mean shift point with every feature point, initializing it to coincide with that point, and iteratively moving it to the mode of the density function according to the invention.

4. Then, as shown in process action 310, the system and method of the invention associates a mean shift point $M(x_i)$ with every feature point (pixel), $x_i$, initialize it to coincide with that point, and then run the iterative sample point segmentation update. More specifically, as shown in FIG. 3D, process actions 310a through 310h the system and method of the invention for each mean shift point associated with each feature point $M(x_i)$ iteratively Determines the neighbors, $x_j$, of $M(x_i)$ as in (18) replacing $x_i$ with $M(x_i)$ (process action 310c).

Calculates the mean shift vector summing over the neighbors:

$$M_v(x_i) = \frac{\sum_{j=1}^{n} (x_j - M(x_i)) \left\| \frac{M(x_i^r) - x_j^r}{h^r(H_j^s)} \right\|^2}{\sum_{j=1}^{n} \left\| \frac{M(x_i^r) - x_j^r}{h^r(H_j^s)} \right\|} \quad (20)$$

(process actions 310d).
   Updates the mean shift point:

$$M(x_i) \leftarrow (x_i) + M_v(x_i) \quad (21)$$

until $M_v(x_i)$ is less than a specified epsilon (process actions 310e, 310f).

5. The present invention then merges pixels whose mean vectors are approximately the same to produce homogenous color regions (process action 312).

6. Optionally, the present invention eliminates segments containing less than a given number of pixels (process action 314).

2.4. Initial Scale Selection.

As in traditional mean shift image segmentation, the anisotropic kernel mean shift segmentation algorithm also relies on two initial parameters: the initial bandwidths in spatial/lattice and range/color domains. However, since the bandwidth matrices His and the bandwidth in range domain $h^r(H_i^s)$ are adaptively modulated, the proposed algorithm is more robust to the initial parameters.

To further increase the robustness, one may also adopt the semi-parametric scale selection method described in [3]. The system automatically determines an initial spatial bandwidth for each kernel associated with a point, and the user thus is only required to set one parameter: the bandwidth $h_0^r$ in range/color domain. The local scale is given as the bandwidth that maximizes the norm of the normalized mean shift vector. Refer to [3] for the detailed description and proof.

3.0 Results.

Figure 4:
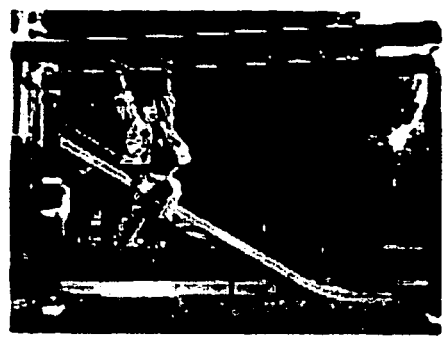
FIG. 4 depicts the first frame of a short 10 second video of a girl swinging on monkey bars taken by stationary camera.
Figure 5:
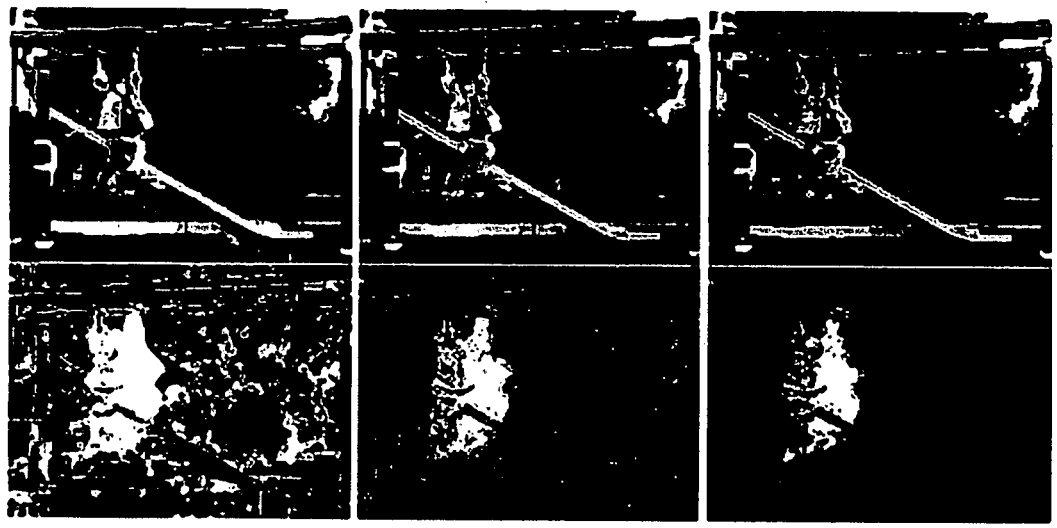
FIG. 5 depicts examples of mean shift segmentation. The first row depicts: (1) Segmented result for 2D radially symmetric kernel, (2) 3D radially symmetric kernel, (3) 3D with anisotropic kernel. Note the larger segments in background for the anisotropic kernel while preserving detail in the girl's segmentation. The second row depicts: total absolute differences across nine pairs of subsequent frames in a ten frame sequence, 2D, 3D radially symmetric, 3D anisotropic. Note the clean segmentation of the moving girl from the background.
Figure 6:
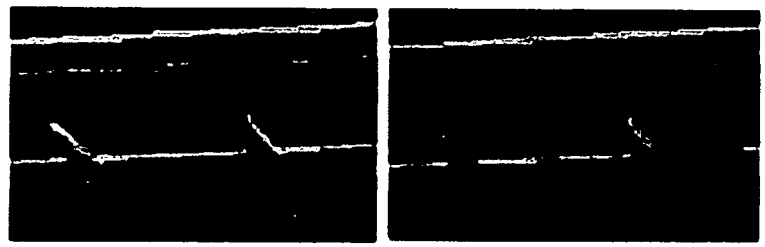
FIG. 6 depicts a comparison of a 3D radially symmetric kernel result (left) and an anisotropic result (right). Note the straighter segments in the latter.

The anisotropic mean shift system and method of the present invention outlined above was used on a number of video and still imagery. The first set of images are taken from a short 10 second video of a girl swinging on monkey bars taken from a stationary camera. A ten frame sequence was first examined, one frame is shown in FIG. 4. The frames were segmented in three ways: 1) each individually with a standard radially symmetric kernel, 2) segmenting the 3D block of video with radially symmetric kernels, and 3) with 3D anisotropic kernels. The results are shown in FIG. 5 along with summed pairwise differences between frames, below. The first row depicts: (1) Segmented result for 2D radially symmetric kernel, (2) 3D radially symmetric kernel, (3) 3D with anisotropic kernel. Note the larger segments in background for the anisotropic kernel while preserving detail in the girl's segmentation. The second row depicts: total absolute differences across nine pairs of subsequent frames in a ten frame sequence, 2D, 3D radially symmetric, 3D anisotropic. Note the clean segmentation of the moving girl from the background. The expected temporal coherence from the stationary camera is faithfully captured in the anisotropic case. FIG. 6 depicts a comparison of a 3D radially symmetric kernel result (left) and an anisotropic result (right). Note the straighter segments in the latter.

Figure 7:
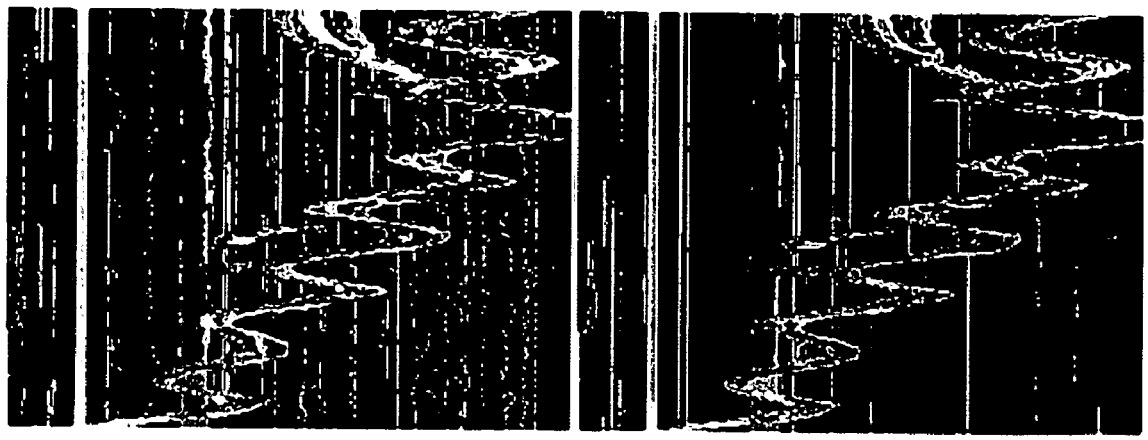
FIG. 7 depicts a spatio-temporal slice of a full 10 second video segmented by a radially symmetric kernel mean shift (left, 384 segments) and with the anisotropic kernel mean shift (right, 394 segments). Note the temporal coherence indicated by the straight vertical segmentation.
Figure 8:
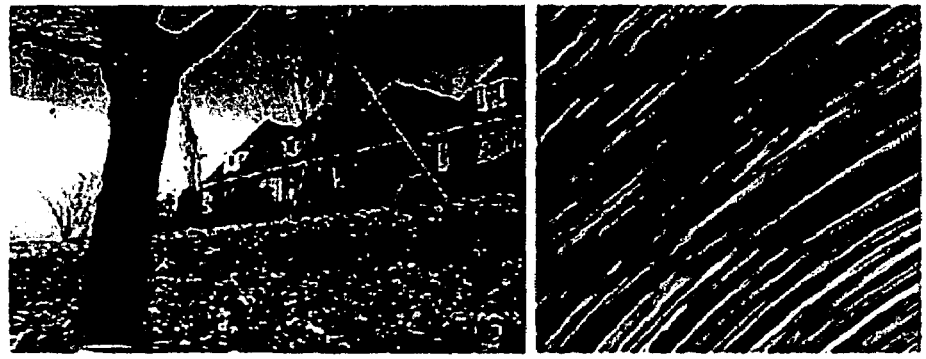
FIG. 8 depicts a well known garden sequence frame and an epipolar slice.
Figure 9:
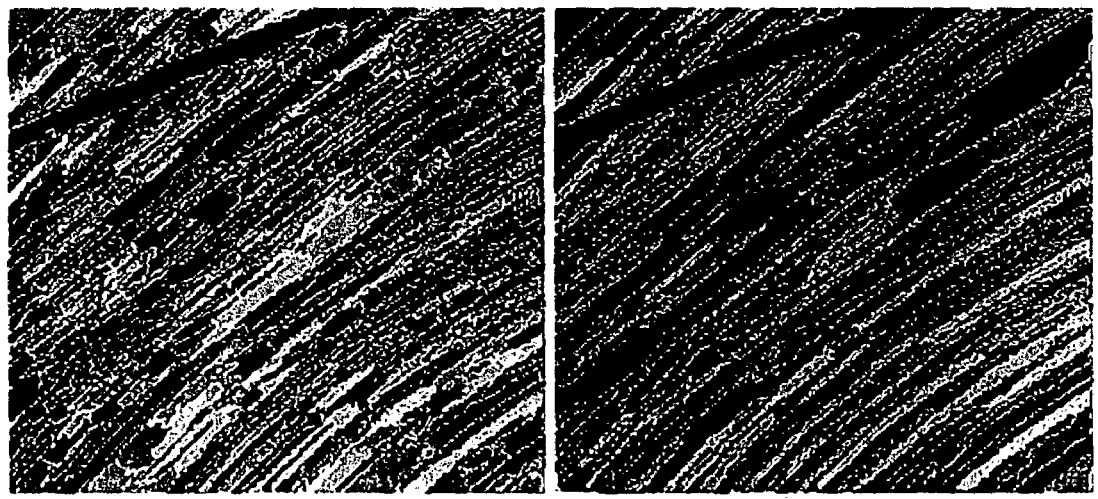
FIG. 9 depicts and image segmented with radially symmetric and anisotropic segmentation (267 and 266 segments).
Figure 10:
FIG. 10 depicts an image segmented with radially symmetric and anisotropic kernels (386 and 387 segments).

The detail of the monkey bars (FIG. 6) shows how salient features such as the straight bars are also better preserved. Finally, the comparison of symmetric vs. anisotropic kernels on spatio-temporal slices from the monkey bars sequence (FIG. 7) and the well known garden sequence (FIG. 8) that show much improved segmentation along the trajectories of objects typically found in video are shown. FIG. 7 depicts a spatio-temporal slice of a full 10 second video segmented by a radially symmetric kernel mean shift (left, 384 segments) and with the anisotropic kernel mean shift (right, 394 segments). Note the temporal coherence indicated by the straight vertical segmentation. FIG. 9 depicts radially symmetric (left) and anisotropic segmentation (right) (267 and 266 segments, respectively). A last example run on a zebra image, FIG. 10, shows improvement as well in capturing long thin features. In FIG. 10, an image segmented with radially symmetric (left) and anisotropic kernels (right) is shown (386 and 387 segments, respectively).

3.1 Robustness.

Figure 11:
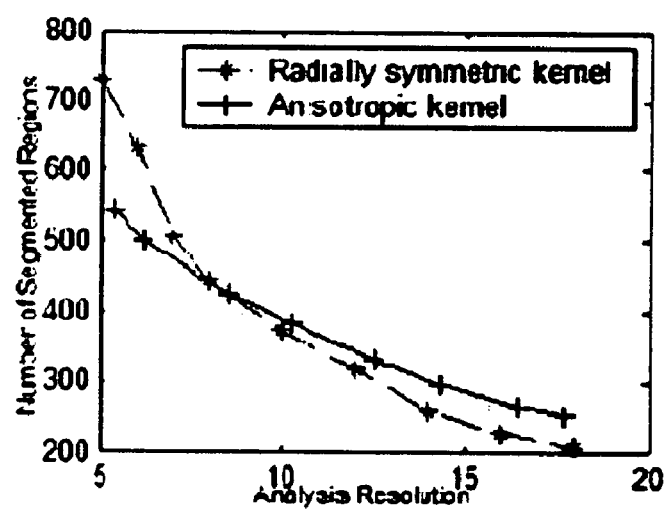
FIG. 11 depicts the number of segmentation regions versus the analysis resolution for both radially symmetric and anisotropic kernels.

The anisotropic kernel mean shift is more robust to initial parameters than the traditional mean shift. To test this, the system and method of the invention correlated the number of segmented regions to the analysis resolution on the monkey bars spatio-temporal slice. The variable $h^r$ was fixed to be 6.5 (in the 0 to 255 color space) in both cases. The analysis resolution was then defined as $h^s$ for the fixed symmetric kernels, and the average value from the decomposition of the $H_i^s$ in equation (11). As expected, and shown in FIG. 11, the number of segments increases as the analysis resolution decreases in both cases. However, the slope is almost twice as steep in the radially symmetric case as with the anisotropic kernel. This indicates that the traditional algorithm is more sensitive to initial parameters than the system and method of the invention. Furthermore, by incorporating the scale selection method, the system and method of the present invention automatically selects initial spatial bandwidth.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

1. Comaniciu, D., Meer, P.: Mean shift analysis and applications. Proc. IEEE Int. Conf. on Computer Vision, Greece (1999) 1197-1203.
2. Comaniciu, D., Ramesh, V., Meer, P.: Real-time tracking of non-rigid objects using mean shift. Proc. IEEE Int. Conf. on Computer Vision and Pattern Recognition (2000) 142-151.
3. DeMenthon, D., Megret, R.: The variable bandwidth mean shift and data-driven scale selection. Proc. IEEE 8th Int. Conf. on Computer Vision, Canada (2001) 438-445.
4. Comaniciu, D.: An Algorithm for Data-Driven Bandwidth Selection. IEEE Transactions on Pattern Analysis and Machine Intelligence, Vol. 25, No. 2, February 2003 (2003).
5. Comaniciu, D., Meer, P.: Mean shift: a robust approach toward feature space analysis. IEEE Trans. on PAMI (2002) 603-619.
6. DeMenthon, D., Megret, R.: Spatio-temporal segmentation of video by hierarchical mean shift analysis. Proc. IEEE Int. Conf. on Computer Vision and Pattern Recognition (2000) 142-151.
7. Fukunaga, K., Hostetler, L.: The estimation of the gradient of a density func-tion, with applications in pattern recognition. IEEE Trans. Information Theory 21 (1975) 32-40
8. Lorensen, W. E., Cline, H. E.: Marching Cubes: a high resolution 3D surface reconstruction algorithm. Proc. ACM SIGGRAPH 1987, (1987) 163-169.
9. Megret, R., DeMenthon, D.: A Survey of Spatio-Temporal Grouping Techniques. Technical report: LAMP-TR-094/CS-TR4403, University of Maryland, College Park (1994).
10. Pal, N. R., Pal, S. K.: A review on image segmentation techniques. Pattern Recognition 26 9 (1993) 1277-1294
11. Skarbek, W., Koschan, A.: Colour Image Segmentation: A survey. Technical report, Technical University Berlin (1994).
12. Wand, M., Jones, M.: Kernel Smoothing. Chapman & Hall (1995) p. 95.

What is claimed is:

1. A computer-implemented process for segmenting image data, comprising the process actions of:

inputting an image;

segmenting said image using a mean shift segmentation technique employing anisotropic kernels; wherein segmenting said image comprises:

initializing kernel data;

for each of a set of feature points, determining an anisotropic kernel with a spatial component and a related color component;

associating a mean shift point with every feature point and initializing said mean shift point to coincide with that feature point;

updating mean shift points by iterative anisotropic mean shift updates; and merging vectors associated with feature points that are approximately the same to produce homogeneous color regions.

2. The computer-implemented process of claim 1 wherein the anisotropic kernels comprise a spatial/lattice component and a space dependent range/color domain component.

3. The computer-implemented process of claim 1 wherein the anisotropic kernels comprise a spatial/lattice component and a range/color domain component that is not space dependent.

4. The computer-implemented process of claim 1 wherein initializing the kernel data comprises the process actions of:
transferring pixels of said image into multi-dimensional feature points, $x_i$;
specifying an initial spatial domain parameter $h_0^s$ and an initial range domain parameter $h_0^r$;
associating kernels with said feature points;
initializing means of kernels as the value of said feature points associated with kernels; and
setting initial kernel bandwidth matrices in the spatial/lattice domain as the diagonal matrix $H_i^s=(h_0^s)^2 I$ and in the range/color domain setting $h^r(H_i^s)=h_0^r$, where I is the identity matrix.

5. The computer-implemented process of claim 1, wherein for each of a set of feature points, determining an anisotropic kernel with a spatial/lattice component and a related range/color component, comprising the process actions of:
for each feature point $x_i$, searching the neighbors of said feature point $x_j$, $j=1,\ldots,n$ to obtain all feature points that satisfy the constraints of the kernels;
iteratively updating a bandwidth matrix of the anisotropic kernel in the spatial domain,
modulating the bandwidth of the anisotropic kernel in the spatial domain; and
modulating the color tolerance of the related color component.

6. The computer-implemented process of claim 5 wherein the constraints of kernels are defined by:

$$k^2\left(g((x_i, x_j, H_i^S)) < 1; k^r \left\|\frac{x_i - x_j}{h^r(H_i^S)}\right\|^2 < 1\right)$$

where $H_i^s$ is the spatial/lattice bandwidth matrix and $h^r$ is the range/color bandwidth, parameter.

7. The computer-implemented process of claim 5 wherein the bandwidth matrix $H_i^s$ is updated as:

$$H_i^s \leftarrow \frac{\sum_{j=1}^{n} \left\|\frac{x_i^r - x_j^r}{h^r(H_i^s)}\right\|^2 (x_j^s - x_i^s)(x_i^s - x_j^s)^T}{\sum_{j=1}^{n} \left\|\frac{x_i^r - x_j^r}{h^r(H_i^s)}\right\|^2}.$$

8. The computer-implemented process of claim 7 wherein the range/color bandwidth parameter $h^r(H_i^s)$ is updated as:

$$h^r(H_i^S) \leftarrow \sqrt{\frac{\lambda'}{\lambda}} \cdot h^r(H_i^S).$$

9. The computer-implemented process of claim 5 wherein the segmentation is a single image segmentation and wherein modulations are applied to exaggerate eccentricity and modify scale.

10. The computer-implemented process of claim 5 wherein the segmentation is video segmentation and wherein modulations are applied for exaggerating eccentricity, scaling static segments, and overall scale.

11. The computer-implemented process of claim 1, wherein updating the mean shift points by iterative anisotropic mean shift updates, comprises the process actions of:
for each mean shift point $M(x_i)$,
determining the neighboring feature points $x_i$;
calculating a mean shift vector $M(x_i)$ summing over all the neighboring mean shift points; and
updating the mean shift points;
until the change in the mean shift points is less than a specified amount.

12. The computer-implemented process of claim 11 wherein the mean shift vector is calculated as:

$$M_v(x_i) = \frac{\sum_{j=1}^{n} (x_j - M(x_i)) \left\|\frac{M(x_i^r) - x_j^r}{h^r(H_j^s)}\right\|^2}{\sum_{j=1}^{n} \left\|\frac{M(x_i^r) - x_j^r}{h^r(H_j^s)}\right\|}.$$

13. A system for segmenting image data, comprising:
defining an anisotropic kernel of influence for each pixel in an image, wherein said kernel defines a measure of intuitive distance between pixels, where distance encompasses both spatial/lattice and range/color distance; and
assigning to each pixel a mean shift point initialized to coincide with said pixel;
iteratively moving each mean shift point upwards along the gradient of the kernel density function defined by the sum of all the kernels until they reach a stationary point; and
considering pixels that are associated with the set of mean shift points that migrate to the approximately same stationary point to be members of a single segment.

14. The system of claim 13, further comprising:
combining neighboring segments.

15. The system of claim 13, further comprising eliminating segments that contain less than a specified number of pixels.

16. The system of claim 13 wherein the image is a portion of video data and wherein distance further comprises temporal distance.

17. A computer-readable storage medium encoded with computer executable instructions for segmenting image data, said computer executable instructions comprising:
inputting image data; and
segmenting said image data using a mean shift segmentation technique employing generally elliptical kernels wherein the computer-executable instruction for segmenting said image data comprises sub-instructions for:
initializing kernel data;
for each feature point, determining a kernel being a product of kernels with at least one of these kernels being elliptical;
associating a mean shift point with every feature point and initializing said mean shift point to coincide with that feature point;

updating mean shift points by an iterative anisotropic mean shift update; and merging vectors associated with feature points that are approximately the same to produce homogeneous color regions.

18. The computer-readable storage medium of claim 17 wherein an elliptical kernel comprises a spatial component.

19. The computer-readable storage medium of claim 18 wherein the image is a portion of video data and wherein the generally elliptical kernel further comprises a time component.

20. The computer-readable medium of claim 18 wherein said spatial kernel has a constant profile, $k^s(z)=1$ if $|z|<1$, and 0 otherwise.

21. The computer-readable storage medium of claim 17 wherein a non-elliptical kernel comprises a color domain component.

22. The computer-readable medium of claim 21 wherein said color component uses an Epanechnikov kernel with a profile $k^r(z)=1-|z|$ if $|z|<1$ and 0 otherwise.

23. The computer-readable storage medium of claim 17 wherein the computer-executable instruction for segmenting said image data using a mean shift segmentation technique, comprises a sub-instruction for defining the shape of a elliptical kernel as $\lambda DAD^T$ where $\lambda$ defines the overall volume of the kernel, A defines the relative lengths of the axes, and D is a rotation matrix that orients the kernel in space and time.

24. The computer-readable storage medium of claim 23 wherein the computer-executable instruction for segmenting said image data using a mean shift segmentation technique, further comprises a sub-instruction to modify the shape of an elliptical kernel by varying $\lambda$, A or D.

25. The computer-readable storage medium of claim 24 wherein by varying $\lambda$ the spatial size of the kernel is adjusted.

26. The computer-readable storage medium of claim 24 wherein by varying A the shape of the kernel is varied.

27. The computer-readable storage medium of claim 26 wherein segmentation to segment elongated regions is encouraged by defining A as a diagonal matrix of Eigen values which is normalized to satisfy:

$$\prod_{i=1}^{p} a_i = 1$$

where $a_i$ is the $i^{th}$ diagonal elements of A, and $a_i \geq a_j$, for $i<j$; and wherein the smaller Eigen values of A are diminished by:

$$a_i = \begin{cases} a_i^{3/2} & a_i <= 1 \\ \sqrt{a_i} & a_i > 1 \end{cases}, i = 2, \ldots, p.$$

28. The computer-readable storage medium of claim 26 wherein larger segments for static objects are created by computing a scale factor $s_1$ as $$s_t = \alpha + (1-\alpha) \prod_{i=1}^{p-1} d_1(i)^2$$

where $d_1$ is the first Eigen vector in D, which corresponds with the largest Eigen value $a_1 \cdot d_1(i)$ stands for the ith element in $d_1$, which is the x, y and t component of the vector when i=1, 2, 3, respectively, and $\alpha$ is a constant between 0 and 1;

setting $\alpha$ to 0.25;

changing A to $a_i'=a_i \cdot s_t$, i=2, ..., p;

modifying A as $$a_i = \begin{cases} a_i^{3/2} & a_i <= 1 \\ \sqrt{a_i} & a_i > 1 \end{cases}, i = 2, \ldots, p$$

or modifying A as $$s_t = \alpha + (1-\alpha) \prod_{i=1}^{p-1} d_1(i)^2;$$

and changing global scalar $\lambda$ as $$\lambda' = \lambda \prod_{i=1}^{p} \frac{a_i}{a_i'}.$$

* * * * *